United States Patent
Garcia et al.

(10) Patent No.: US 9,960,897 B2
(45) Date of Patent: May 1, 2018

(54) METHOD AND DEVICE FOR SCHEDULING OF FEEDBACK

(71) Applicant: Telefonaktiebolaget LM Ericsson (publ), Stockholm (SE)

(72) Inventors: Virgile Garcia, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 58 days.

(21) Appl. No.: 14/646,822

(22) PCT Filed: Apr. 9, 2015

(86) PCT No.: PCT/CN2015/076202
§ 371 (c)(1),
(2) Date: May 22, 2015

(87) PCT Pub. No.: WO2016/161608
PCT Pub. Date: Oct. 13, 2016

(65) Prior Publication Data
US 2016/0316482 A1   Oct. 27, 2016

(51) Int. Cl.
*H04W 72/12* (2009.01)
*H04L 5/00* (2006.01)
*H04L 1/18* (2006.01)

(52) U.S. Cl.
CPC .......... *H04L 5/0055* (2013.01); *H04L 1/1854* (2013.01); *H04L 1/1861* (2013.01); *H04L 1/1896* (2013.01)

(58) Field of Classification Search
CPC ... H04L 5/0055; H04L 1/1812; H04L 1/1861; H04W 72/0413; H04W 72/042
See application file for complete search history.

(56) References Cited

U.S. PATENT DOCUMENTS 7,323,991 B1 * 1/2008 Eckert .................. G07C 9/00111
                                                           235/382
2008/0215704 A1 * 9/2008 Curcio .............. H04L 29/06027
                                                           709/217
(Continued)

FOREIGN PATENT DOCUMENTS

CN     101316124 A1    12/2008
CN     102647263 A1     8/2012
(Continued)

OTHER PUBLICATIONS

Internaitonal Search Report and Written Opinion dated Dec. 28, 2015 for corresponding International Application Serial No. PCT/CN2015/076202, International Filing Date—Apr. 9, 2015 consisting of 11-pages.

(Continued)

*Primary Examiner* — Jamal Javaid
(74) *Attorney, Agent, or Firm* — Christopher & Weisberg, P.A.

(57) ABSTRACT

The present disclosure provides a method in a communication device for scheduling of feedback. The method includes determining, for a data transmission, a resource element to be scheduled for a feedback signal being responsive to the data transmission. The resource element is determined to be within a feedback time limit. The feedback time limit indicates a maximum allowable time period between transmitting the data transmission and receiving the feedback signal. The feedback time limit is dependent on a type of resource allocated to the data transmission and/or a type of traffic associated with the data transmission. The method further includes transmitting, to a wireless device, a feedback scheduling instruction indicating the resource element.

32 Claims, 6 Drawing Sheets

(56) References Cited

U.S. PATENT DOCUMENTS

| | | | | |
|---|---|---|---|---|
| 2011/0039593 A1* | 2/2011 | Lee | ............... | H04L 5/001 |
| | | | | 455/515 |
| 2012/0213074 A1* | 8/2012 | Goldfarb | ............... | H04L 43/026 |
| | | | | 370/235 |
| 2013/0301569 A1* | 11/2013 | Wang | ............... | H04L 5/0055 |
| | | | | 370/329 |
| 2013/0308464 A1 | 11/2013 | Park et al. | | |

FOREIGN PATENT DOCUMENTS

| | | |
|---|---|---|
| EP | 1751932 | 12/2005 |
| EP | 2 549 819 B1 | 10/2014 |
| WO | 2005122506 A1 | 12/2005 |
| WO | 2013177793 A1 | 12/2013 |
| WO | 2014112191 A1 | 7/2014 |

OTHER PUBLICATIONS

Extended European Search Report and Written Opinion dated Mar. 2, 2018 for corresponding European Application Serial No. EP 15 88 8165, International Filing Date—Apr. 9, 2015 consisting of 8-pages.

\* cited by examiner

_US 9,960,897 B2_

METHOD AND DEVICE FOR SCHEDULING OF FEEDBACK

TECHNICAL FIELD

The disclosure relates to communication technology, and more particularly, to a method and device for scheduling of feedback, as well as a method and device for transmitting a feedback signal.

BACKGROUND

Currently, mobile communication technologies are evolving towards higher frequency, larger carrier bandwidth, higher data rate and more heterogeneous layers. Future mobile networks, e.g., the $5^{th}$ Generation (5G) mobile networks, are likely to be a combination of the $3^{rd}$ Generation (3G) technologies, the $4^{th}$ Generation (4G) technologies and new features such as Ultra-Density Network (UDN) or millimeter Wave Radio Access Technology (mmW-RAT).

FIG. 1 shows an exemplary structure of an mmW-RAT network. As shown in FIG. 1, a cluster of Access Nodes (ANs) 104, 106 and 108 are connected to and controlled by a Central Control Unit (CCU) 102. A User Equipment (UE) 110 is served by the ANs 104 and 106 via radio links, Link #1 and Link #2, respectively. The CCU 102 coordinates resource allocations in the cluster of ANs.

One mmW-RAT carrier may consist of a number of sub-carriers. Each sub-carrier can have a certain bandwidth, e.g. 100 MHz, and the total carrier bandwidth can be up to 1 GHz or 2 GHz. FIG. 2 illustrates an exemplary template frame containing 4 sub-carriers. In FIG. 2, the smallest resource grid in time and frequency is referred to as a resource element (RE) or an Atomic Scheduling Unit (ASU). As an example, the hatched REs in FIG. 2 can be allocated to Link #1. Among the hatched REs, those labeled as "D" are dedicated resources and those labeled as "S" are shared resources. Link #1 has the highest priority to access the dedicated resources and any neighboring link (e.g., Link #2) shall avoid interference to Link #1 over these resources. Accordingly, Link #1 can achieve a high reliability over the dedicated resources. On the other hand, the shared resources, as the name suggests, can be shared by more than one link (e.g., Link #1 and Link #2) simultaneously. Hence, the use of the shared resources by Link #2 may cause interference to Link #1 which is also using these resources. The shared resources provide for an increased link throughput, but have a lower reliability. Operations at Medium Access Control (MAC) layer can be performed based on the above resource allocation, which can be scheduled by the CCU 102 in accordance with e.g., interference levels measured in the cluster and data rates over the respective links.

In wireless communications, various feedback signals are required at different layers for various purposes. For example, at the MAC layer, an Acknowledgement (ACK) or Negative Acknowledgement (NACK) signal can be provided as a feedback signal for a data transmission, such that the sender of the data transmission can determine whether to resend the data transmission or not. In Long Term Evolution (LTE) for example, resources for ACK/NACK signals are allocated in a fixed, predefined manner. That is, for a data transmitted in a subframe having an index n, an ACK/NACK feedback signal is automatically scheduled to be transmitted in a subframe having an index n+k, where k is a fixed, predefined number for n. Such resource allocation is static and may not be suitable for the mmw-RAT network.

There is thus a need for an improved solution for resource allocation for feedback signals.

SUMMARY

It is an object of the present disclosure to provide a method and device for scheduling of feedback, as well as a method and device for transmitting a feedback signal, capable of achieving an improved flexibility associated with resource allocation for feedback signals.

In a first aspect, a method in a communication device for scheduling of feedback is provided. The method comprises: determining for a data transmission a resource element to be scheduled for a feedback signal being responsive to the data transmission. The resource element is determined to be within a feedback time limit. The feedback time limit indicates a maximum allowable time period between transmitting the data transmission and receiving the feedback signal. The feedback time limit is dependent on a type of resource allocated to the data transmission and/or a type of traffic associated with the data transmission. The method further comprises: transmitting to a wireless device a feedback scheduling instruction indicating the resource element.

In an embodiment, the feedback signal is transmitted at a Medium Access Control (MAC) layer.

In an embodiment, the feedback signal is an Acknowledgement (ACK) or Negative Acknowledgement (NACK) signal.

In an embodiment, the type of resource is one of a dedicated resource and a shared resource.

In an embodiment, the method further comprises: receiving the feedback time limit from a control device.

In an embodiment, the feedback scheduling instruction is transmitted before a scheduling time limit expires, such that the feedback signal can be received before the feedback time limit expires.

In an embodiment, the scheduling time limit is set depending on the type of resource and/or the type of traffic.

In an embodiment, the resource element is aligned in time with one or more other resource elements to be scheduled for another feedback signal.

In an embodiment, the resource element is aligned in time with one or more other resource elements scheduled for another data transmission.

In an embodiment, the feedback scheduling instruction further indicates the feedback time limit.

In a second aspect, a communication device for scheduling of feedback is provided. The communication device comprises: a determining unit configured to determine for a data transmission a resource element to be scheduled for a feedback signal being responsive to the data transmission. The resource element is determined to be within a feedback time limit. The feedback time limit indicates a maximum allowable time period between transmitting the data transmission and receiving the feedback signal. The feedback time limit is dependent on a type of resource allocated to the data transmission and/or a type of traffic associated with the data transmission. The communication device further comprises: a transmitting unit configured to transmit to a wireless device a feedback scheduling instruction indicating the resource element.

The above embodiments of the first aspect are also applicable for the second aspect.

In a third aspect, a method in a wireless device for transmitting a feedback signal responsive to a data transmission from a communication device is provided. The method comprises: receiving from the communication device a feedback scheduling instruction indicating one or more resource elements scheduled for the feedback signal; and transmitting the feedback signal to the communication device using at least one of the one or more resource elements.

In an embodiment, the feedback signal is transmitted at a Medium Access Control (MAC) layer.

In an embodiment, the feedback signal is an Acknowledgement (ACK) or Negative Acknowledgement (NACK) signal.

In an embodiment, the method further comprises: aggregating an ACK/NACK responsive to a portion of the data transmission with at least another ACK/NACK responsive to another portion of the data transmission in the feedback signal.

In an embodiment, the feedback signal is multiplexed with a data transmission to the communication device.

In an embodiment, the method further comprises, prior to the step of receiving the feedback scheduling indication: detecting an event that triggers transmission of the feedback signal; and transmitting to the communication device a scheduling request in response to the detection.

In an embodiment, the feedback scheduling instruction further indicates a feedback time limit, the feedback time limit indicating a maximum allowable time period between the communication device transmitting the portion of the data transmission and the communication device receiving the feedback signal and is dependent on a type of resource allocated to the data transmission and/or a type of traffic associated with the data transmission.

In an embodiment, the at least one resource element is selected from the one or more resource elements based on the feedback time limit.

In an embodiment, the type of resource is one of a dedicated resource and a shared resource.

In a fourth aspect, a wireless device for transmitting a feedback signal responsive to a data transmission from a communication device is provided. The wireless device comprises: a receiving unit configured to receive from the communication device a feedback scheduling instruction indicating one or more resource elements scheduled for the feedback signal; and a transmitting unit configured to transmit the feedback signal to the communication device using at least one of the one or more resource elements.

The above embodiments of the third aspect are also applicable for the fourth aspect.

With the embodiments of the present disclosure, a resource element to be scheduled for a feedback signal being responsive to a data transmission is determined within a feedback time limit. The feedback time limit indicates a maximum allowable time period between transmitting the data transmission and receiving the feedback signal and is dependent on a type of resource allocated to the data transmission and/or a type of traffic associated with the data transmission. In this way, it is possible to achieve an improved flexibility in resource allocation for the feedback signal.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
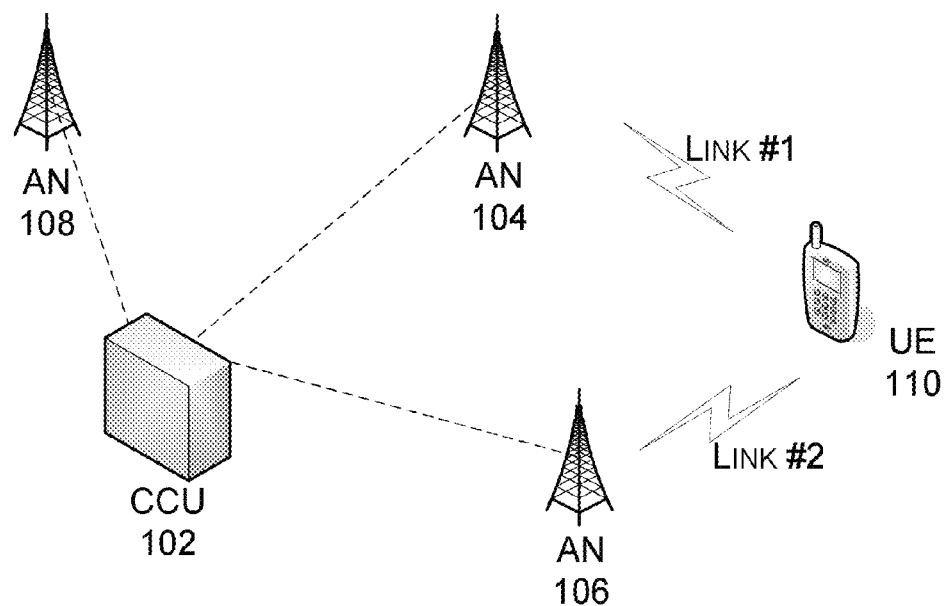
FIG. 1 is a schematic diagram showing an exemplary structure of an mmw-RAT network.
Figure 2:
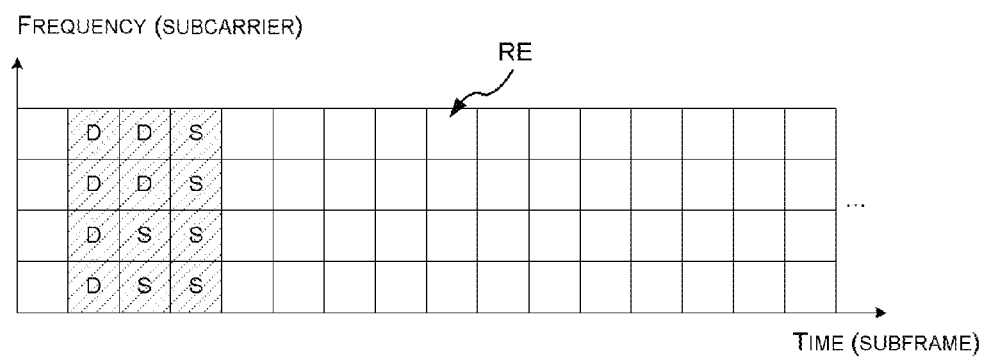
FIG. 2 is a schematic diagram showing resources in an exemplary template frame.
Figure 3:
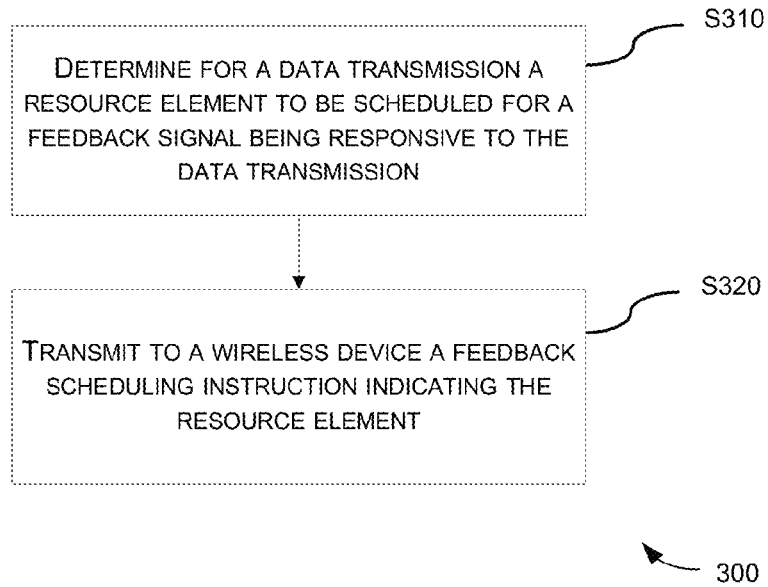
FIG. 3 is a flowchart illustrating a method for scheduling of feedback according to an embodiment of the present disclosure.

FIG. 3 is a flowchart illustrating a method 300 for scheduling of feedback according to an embodiment of the present disclosure. The method 300 can be performed at a communication device (e.g., AN 104 or UE 110 in FIG. 1). For example, the method 300 can be applied in the AN 104 for scheduling an RE for a feedback signal. The feedback signal may be transmitted from the UE 110 to the AN 104 in response to a data transmission from the AN 104 to the UE 110. It can be appreciated by those skilled in the art that the feedback signal may alternatively be transmitted from the AN 104 to the UE 110 in response to a data transmission from the UE 110 to the AN 104. The method 300 can also be applied in the UE 110 which is in a Device to Device (D2D) communication with another UE. In this case, the feedback signal can be transmitted from the UE 110 to the other UE, or vice versa.

In the following, it is assumed that the feedback signal is transmitted from a wireless device (e.g., UE 110) to the communication device (e.g., AN 104) in response to a data transmission from the communication device to the wireless device, without loss of generality.

At step S310, for the data transmission from the communication device to the wireless device, an RE to be scheduled for a feedback signal being responsive to the data transmission is determined. The RE is determined to be within a feedback time limit (FTL). The FTL indicates a maximum allowable time period between the communication device transmitting the data transmission and receiving the feedback signal.

In an example, the feedback signal can be transmitted at a Medium Access Control (MAC) layer. The feedback signal can be an Acknowledgement (ACK) or Negative Acknowledgement (NACK) signal. However, the feedback signal in the present disclosure is not limited to the ACK/NACK signal. Rather, it may be a measurement report regarding received signal strength, path loss, channel quality, and the like.

The feedback time limit can be dependent on a type of resource allocated to the data transmission. Here, the type of resource can be one of a dedicated resource and a shared resource, as described above. For example, an FTL for a data transmission over a dedicated resource can be set shorter than that for a data transmission over a shared resource. This is particularly advantageous when the dedicated resource is allocated for control data and the shared resource is allocated for user data.

Additionally or alternatively, the FTL can be dependent on a type of traffic associated with the data transmission. For example, an FTL for a delay sensitive traffic (e.g., online video) can be set shorter when compared to that for a delay insensitive traffic (e.g., file download), so as to prevent the delay from exceeding a predetermined threshold. As another example, an FTL for high data rate traffic can be set shorter when compared to that for low data rate traffic, so as to avoid transmission window stalling. As yet another example, an FTL for traffic requiring low packet loss can be set shorter when compared to that for traffic which can tolerate higher packet loss, so as to allow more retransmissions to be utilized.

In an example, the FTL can be determined by the communication device. Alternatively, the FTL can be configured by a control device (e.g., CCU 102 in FIG. 1). In this case, the FTL can be received from the control device. In the case where the method 300 is applied in a UE, the control device can be an AN serving the UE.

At step S320, a feedback scheduling instruction indicating the RE is transmitted to the wireless device.

In an example, the feedback scheduling instruction is transmitted before a scheduling time limit (STL) expires, such that the feedback signal can be received before the feedback time limit expires. The STL indicates a maximum allowable time period between the communication device transmitting the data transmission and transmitting the feedback scheduling instruction. The STL can be set depending on the type of resource (e.g., dedicated vs. shared) and/or a type of traffic associated with the data transmission. For example, the STL for a dedicated resource can be set shorter when compared to that for a shared resource, which ensures that resource can be scheduled timely for a feedback responsive to the more important control data transmitted over the dedicated resource. As another example, an STL for a delay sensitive traffic can be set shorter when compared to that for a delay insensitive traffic, so as to ensure that resource can be scheduled timely for a feedback responsive to the delay sensitive traffic.

Figure 4:
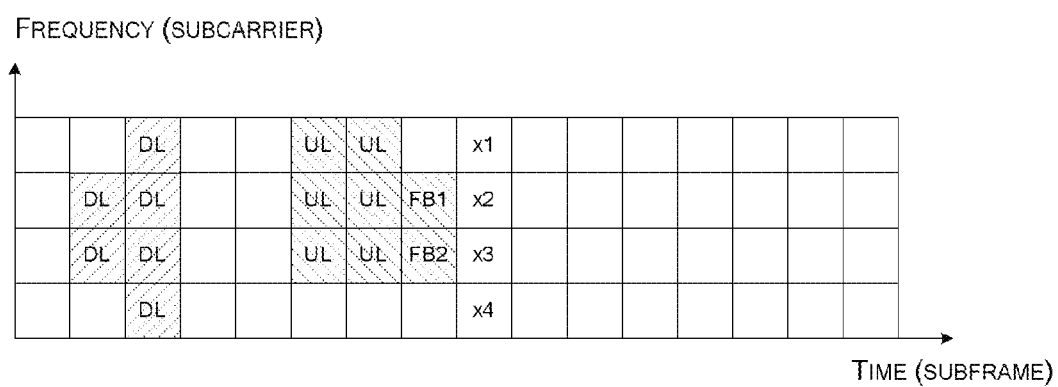
FIG. 4 is a schematic diagram showing an exemplary resource allocation according to an embodiment of the present disclosure.

Additionally, in order to improve the resource utilization, the RE can be aligned in time with one or more other REs to be scheduled for another feedback signal. FIG. 4 shows an exemplary resource allocation. As shown in FIG. 4, each RE labeled as "DL" represents an RE allocated for downlink data transmission (e.g., from AN 104 to UE 110 in FIG. 1) and each RE labeled as "UL" represents an RE allocated for uplink data transmission (e.g., from UE 110 to AN 104 in FIG. 1). In this case, the RE, labeled as "FB1", which is aligned in time with another RE, labeled as "FB2", for another feedback signal (e.g., from another UE to AN 104) can be allocated for the feedback signal. This is particularly advantageous when the communication device does not have a full duplex capability, i.e., it can either transmit or receive at a time over the entire carrier bandwidth. When compared to another resource allocation where the RE labeled as "x1" is allocated for the feedback signal and the RE labeled as "FB2" is allocated for the other feedback signal, the above resource allocation allows the four REs labeled as "x1"~"x4" to be scheduled for uplink/downlink data transmissions.

Figure 5:
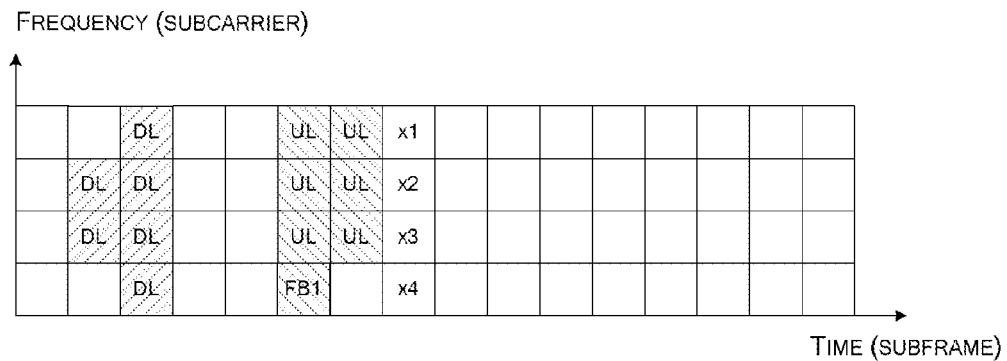
FIG. 5 is a schematic diagram showing an exemplary resource allocation according to another embodiment of the present disclosure.

Additionally or alternatively, the resource element can be aligned in time with one or more other REs scheduled for another data transmission. FIG. 5 shows an exemplary resource allocation. As shown in FIG. 5, each RE labeled as "DL" represents an RE allocated for downlink data transmission (e.g., from AN 104 to UE 110 in FIG. 1) and each RE labeled as "UL" represents an RE allocated for uplink data transmission (e.g., from UE 110 to AN 104 in FIG. 1). In this case, the RE, labeled as "FB1", which is aligned in time with other resource elements scheduled for uplink data transmissions, can be allocated for the feedback signal. This is also particularly advantageous when the communication device does not have a full duplex capability. When compared to another resource allocation where the RE labeled as "x1" is allocated for the feedback signal, the above resource allocation allows the four REs labeled as "x1"~"x4" to be scheduled for uplink/downlink data transmissions. In this way, the resource utilization can be improved.

Figure 6:
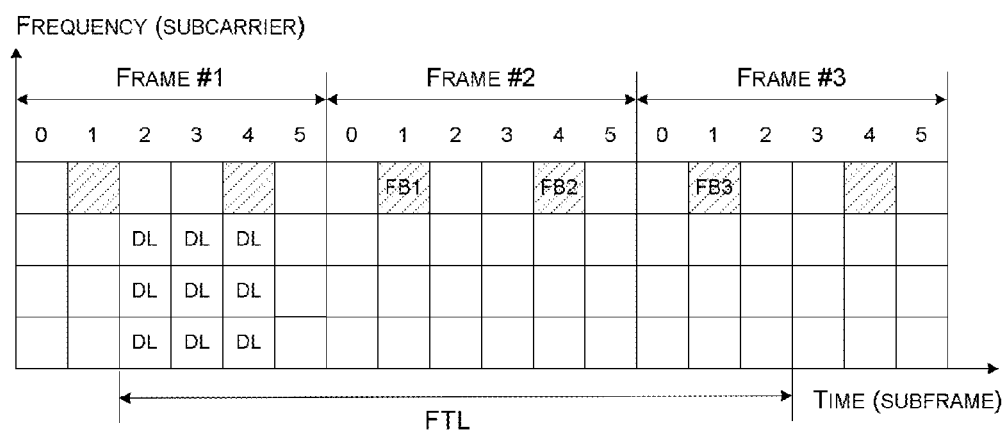
FIG. 6 is a schematic diagram showing an exemplary resource allocation according to yet another embodiment of the present disclosure.

In an example, the feedback scheduling instruction further indicates the FTL. This allows the wireless device to autonomously decide which RE is to be used for the feedback signal, subject to the FTL. FIG. 6 shows an exemplary resource allocation. In the example shown in FIG. 6, each frame includes six subframes indexed as 0~5, respectively. The hatched REs represent REs that are semi-persistently allocated to the wireless device for transmitting feedback signals. The REs labeled as "DL" represent REs for data transmission from the communication device to the wireless device. The FTL is also shown in FIG. 6. It can be seen from the figure that the RE labeled as "FB1", "FB2" or "FB3" can be used so as to satisfy the FTL. In this case, the wireless device can autonomously decide which of the REs "FB1", "FB2" and "FB3" is to be used for transmitting the feedback signal. For example, the wireless device may desire to aggregate as many as feedbacks into one feedback signal. In this case, it may postpone the transmission of the feedback signal as much as possible, subject to the FTL.

Figure 7:
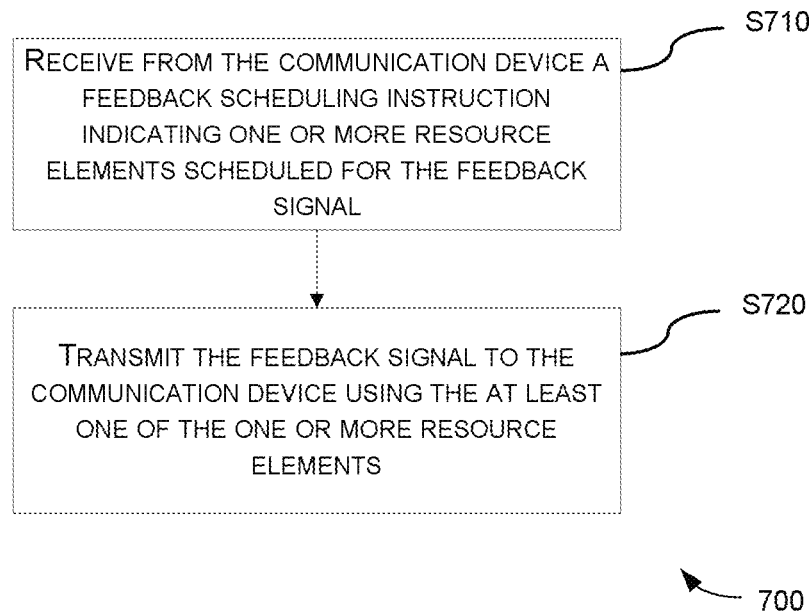
FIG. 7 is a flowchart illustrating a method for transmitting a feedback signal according to an embodiment of the present disclosure.

FIG. 7 is a flowchart illustrating a method 700 for transmitting a feedback signal according to an embodiment of the present disclosure. The method 700 can be performed at a wireless device (e.g., UE 110 in FIG. 1). The feedback signal is responsive to a data transmission from a communication device (e.g., AN 104 in FIG. 1).

At step S710, a feedback scheduling instruction indicating one or more REs scheduled for the feedback signal is received from the communication device.

At step S720, the feedback signal is transmitted to the communication device using the at least one of the one or more REs.

In an example, the feedback signal can be transmitted at a Medium Access Control (MAC) layer. The feedback signal can be an Acknowledgement (ACK) or Negative Acknowledgement (NACK) signal. However, the feedback signal in the present disclosure is not limited to the ACK/NACK signal. Rather, it may be a measurement report regarding received signal strength, path loss, channel quality, and the like.

In an example, an ACK/NACK responsive to a portion of the data transmission can be aggregated with at least another ACK/NACK responsive to another portion of the data transmission in the feedback signal. That is, the wireless device can aggregate more than one feedback into one feedback signal, thereby improving the resource utilization.

Additionally or alternatively, the feedback signal can be multiplexed with a data transmission to the communication device. This is shown in FIG. 5 as described above in connection with the method 300 and the details thereof will be omitted here.

In an example, prior to the step S710, an event that triggers transmission of the feedback signal can be detected and a scheduling request can be transmitted to the communication device in response to the detection. This allows the wireless device to transmit a feedback signal autonomously to the communication device, depending on some local event (e.g., data loss, timeout, update of channel condition, etc.).

In an example, the feedback scheduling instruction further indicates a feedback time limit (FTL). As described above in connection with the method 300, the FTL indicates a maximum allowable time period between the communication device transmitting the portion of the data transmission and the communication device receiving the feedback signal and can be dependent on a type of resource allocated to the data transmission. Here, the type of resource can be one of a dedicated resource and a shared resource. Additionally or alternatively, the FTL can be dependent on a type of traffic associated with the data transmission.

In an example, the at least one RE can be selected from the one or more resource elements based on the FTL. As described above in connection with FIG. 6, the wireless device can autonomously decide which of the REs "FB1", "FB2" and "FB3" is to be used for transmitting the feedback signal. For example, the wireless device may desire to aggregate as many as feedbacks into one feedback signal. In this case, it may postpone the transmission of the feedback signal as much as possible, subject to the FTL. Additionally or alternatively, the at least one resource element can be selected such that the resource utilization can be maximized. For example, the RE can be selected to be aligned in time with one or more other REs to be scheduled for another feedback signal, or with one or more other REs scheduled for another data transmission, as shown in FIG. 4 or FIG. 5.

Figure 8:
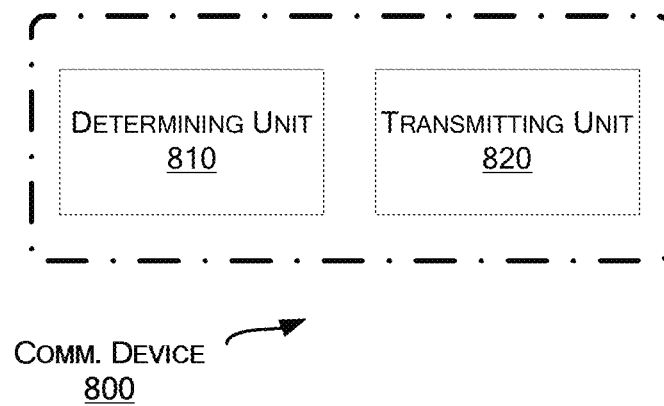
FIG. 8 is a block diagram of a communication device according to an embodiment of the present disclosure.

Correspondingly to the method 300 as described above, a communication device is provided. FIG. 8 is a block diagram of a communication device 800 for scheduling of feedback according to an embodiment of the present disclosure. The communication device 800 can be e.g., AN 104 or UE 110 in FIG. 1.

As shown in FIG. 8, the communication device 800 includes a determining unit 810 configured to determine for a data transmission a resource element to be scheduled for a feedback signal being responsive to the data transmission. The resource element is determined to be within a feedback time limit. The feedback time limit indicates a maximum allowable time period between transmitting the data transmission and receiving the feedback signal. The feedback time limit is dependent on a type of resource allocated to the data transmission and/or a type of traffic associated with the data transmission. The communication device 800 further includes a transmitting unit 820 configured to transmit to a wireless device a feedback scheduling instruction indicating the resource element.

In an embodiment, the feedback signal is transmitted at a Medium Access Control (MAC) layer.

In an embodiment, the feedback signal is an Acknowledgement (ACK) or Negative Acknowledgement (NACK) signal.

In an embodiment, the type of resource is one of a dedicated resource and a shared resource.

In an embodiment, the communication device 800 further includes a receiving unit (not shown) configured to receive the feedback time limit from a control device.

In an embodiment, the transmitting unit 820 is configured to transmit the feedback scheduling instruction before a scheduling time limit expires, such that the feedback signal can be received before the feedback time limit expires.

In an embodiment, the scheduling time limit is set depending on the type of resource and/or the type of traffic.

In an embodiment, the resource element is aligned in time with one or more other resource elements to be scheduled for another feedback signal.

In an embodiment, the resource element is aligned in time with one or more other resource elements scheduled for another data transmission.

In an embodiment, the feedback scheduling instruction further indicates the feedback time limit.

Each of the units 810-820 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 3.

Figure 9:
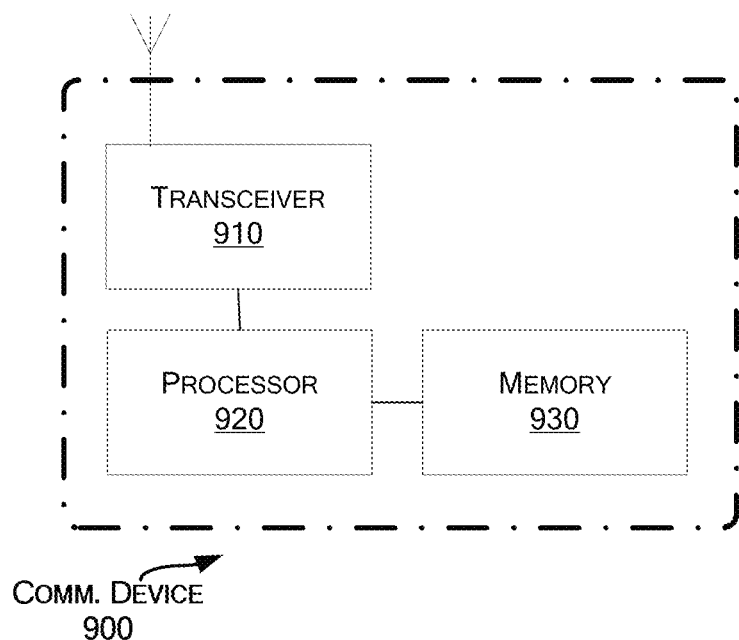
FIG. 9 is a block diagram of a wireless device according to an embodiment of the present disclosure.

FIG. 9 is a block diagram of a communication device 900 for scheduling of feedback according to another embodiment of the present disclosure. The communication device 900 can be e.g., AN 104 or UE 110 in FIG. 1.

The communication device 900 includes a transceiver 910, a processor 920 and a memory 930. The memory 930 contains instructions executable by the processor 920 whereby the communication device 900 is operative to: determine for a data transmission a resource element to be scheduled for a feedback signal being responsive to the data transmission. The resource element is determined to be within a feedback time limit. The feedback time limit indicates a maximum allowable time period between transmitting the data transmission and receiving the feedback signal. The feedback time limit is dependent on a type of resource allocated to the data transmission and/or a type of traffic associated with the data transmission. The memory 930 further contains instructions executable by the processor 920 whereby the communication device 900 is operative to: transmit to a wireless device a feedback scheduling instruction indicating the resource element.

Figure 10:
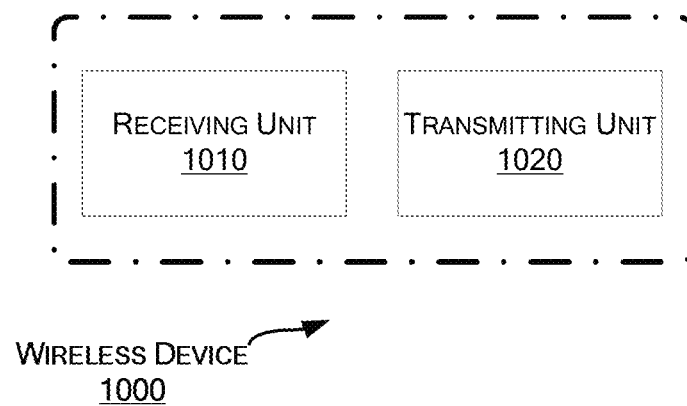
FIG. 10 is a block diagram of a communication device according to another embodiment of the present disclosure.

Correspondingly to the method 700 as described above, a wireless device is provided. FIG. 10 is a block diagram of a wireless device 1000 for transmitting a feedback signal responsive to a data transmission from a communication device according to an embodiment of the present disclosure. The wireless device 1000 can be e.g., UE 110 in FIG. 1.

As shown in FIG. 10, the wireless device 1000 includes a receiving unit 1010 configured to receive from the communication device a feedback scheduling instruction indicating one or more resource elements scheduled for the feedback signal. The wireless device 1000 further includes a transmitting unit 1020 configured to transmit the feedback signal to the communication device using at least one of the one or more resource elements.

In an embodiment, the feedback signal is transmitted at a Medium Access Control (MAC) layer.

In an embodiment, the feedback signal is an Acknowledgement (ACK) or Negative Acknowledgement (NACK) signal.

In an embodiment, the transmitting unit 1020 is further configured to aggregate an ACK/NACK responsive to a portion of the data transmission with at least another ACK/NACK responsive to another portion of the data transmission in the feedback signal.

In an embodiment, the transmitting unit 1020 is further configured to multiplex the feedback signal with a data transmission to the communication device.

In an embodiment, the wireless device 1000 further includes a detecting unit (not shown) configured to detect an event that triggers transmission of the feedback signal. The transmitting unit 1020 is further configured to transmit to the communication device a scheduling request in response to the detection.

In an embodiment, the feedback scheduling instruction further indicates a feedback time limit, the feedback time limit indicating a maximum allowable time period between the communication device transmitting the portion of the data transmission and the communication device receiving the feedback signal and is dependent on a type of resource allocated to the data transmission and/or a type of traffic associated with the data transmission.

In an embodiment, the at least one resource element is selected from the one or more resource elements based on the feedback time limit.

In an embodiment, the type of resource is one of a dedicated resource and a shared resource.

Each of the units 1010-1020 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 7.

Figure 11:
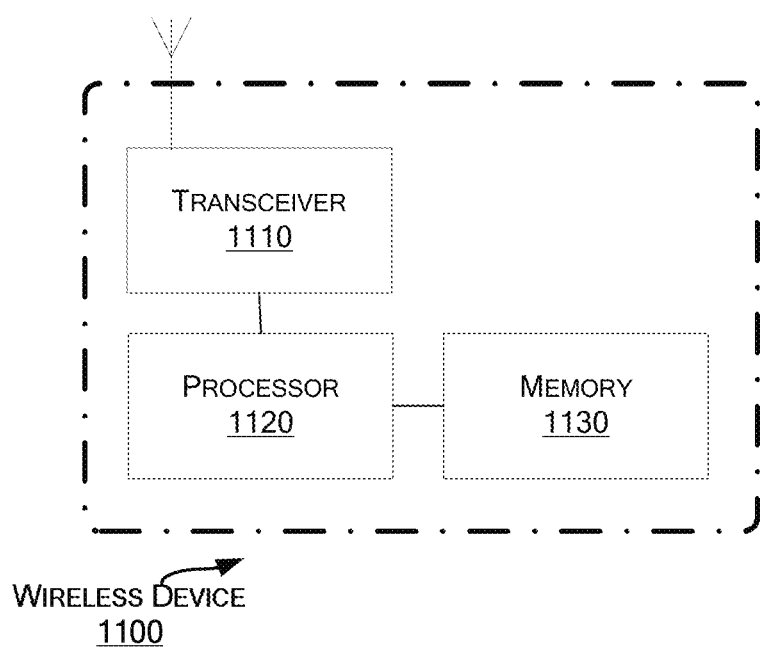
FIG. 11 is a block diagram of a wireless device according to another embodiment of the present disclosure.

FIG. 11 is a block diagram of a wireless device 1100 for transmitting a feedback signal responsive to a data transmission from a communication device according to another embodiment of the present disclosure. The wireless device 1100 can be e.g., UE 110 in FIG. 1.

The wireless device 1100 includes a transceiver 1110, a processor 1120 and a memory 1130. The memory 1130 contains instructions executable by the processor 1120 whereby the wireless device 1100 is operative to: receive from the communication device a feedback scheduling instruction indicating one or more resource elements scheduled for the feedback signal. The memory 1130 further contains instructions executable by the processor 1120 whereby the wireless device 1100 is operative to: transmit the feedback signal to the communication device using at least one of the one or more resource elements.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 920 causes the communication device 900 to perform the actions, e.g., of the procedure described earlier in conjunction with FIG. 3, or when executed by the processor 1120 causes the wireless device 1100 to perform the actions, e.g., of the procedure described earlier in conjunction with FIG. 7.

The computer program product may be configured as a computer program code structured in computer program modules. The computer program modules could essentially perform the actions of the flow illustrated in FIG. 3 or 7.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a communication device for scheduling of feedback, the method comprising:
   determining, for a data transmission, a resource element to be scheduled for a feedback signal being responsive to the data transmission, the resource element being determined to be within a feedback time limit, the feedback time limit indicating a maximum allowable time period between transmitting the data transmission and receiving the feedback signal, the feedback time limit being dependent on at least one of a type of resource allocated to the data transmission and a type of traffic associated with the data transmission; and
   transmitting, to a wireless device, a feedback scheduling instruction before a scheduling time limit expires, such that the feedback signal can be received before the feedback time limit expires, the feedback scheduling instruction indicating the resource element, and the feedback scheduling instruction including an indication of the feedback time limit, the scheduling time limit being set depending on the one of the type of resource and the type of traffic.

2. The method of claim 1, wherein the feedback signal is transmitted at a Medium Access Control (MAC) layer.

3. The method of claim 1, wherein the feedback signal is one of an Acknowledgement (ACK) and Negative Acknowledgement (NACK) signal.

4. The method of claim 1, wherein the type of resource is one of a dedicated resource and a shared resource.

5. The method of claim 1, further comprising:
   receiving the feedback time limit from a control device.

6. The method of claim 1, wherein the resource element is aligned in time with at least one other resource element to be scheduled for another feedback signal.

7. The method of claim 1, wherein the resource element is aligned in time with at least one other resource element scheduled for another data transmission.

8. The method of claim 1, wherein the feedback scheduling instruction further indicates the feedback time limit.

9. A communication device for scheduling of feedback, the communication device comprising:
- a determining unit configured to determine, for a data transmission, a resource element to be scheduled for a feedback signal being responsive to the data transmission, the resource element being determined to be within a feedback time limit, the feedback time limit indicating a maximum allowable time period between transmitting the data transmission and receiving the feedback signal, the feedback time limit being dependent on at least one of a type of resource allocated to the data transmission and a type of traffic associated with the data transmission; and
- a transmitting unit configured to transmit, to a wireless device, a feedback scheduling instruction before a scheduling time limit expires, such that the feedback signal can be received before the feedback time limit expires, the feedback scheduling instruction indicating the resource element, and the feedback scheduling instruction including an indication of the feedback time limit, the scheduling time limit being set depending on the one of the type of resource and the type of traffic.

10. The communication device of claim 9, wherein the feedback signal is transmitted at a Medium Access Control (MAC) layer.

11. The communication device of claim 9, wherein the feedback signal is one of an Acknowledgement (ACK) and Negative Acknowledgement (NACK) signal.

12. The communication device of claim 9, wherein the type of resource is one of a dedicated resource and a shared resource.

13. The communication device of claim 9, further comprising:
- a receiving unit configured to receive the feedback time limit from a control device.

14. The communication device of claim 9, wherein the resource element is aligned in time with at least one other resource element to be scheduled for another feedback signal.

15. The communication device of claim 9, wherein the resource element is aligned in time at least one other resource element scheduled for another data transmission.

16. The communication device of claim 9, wherein the feedback scheduling instruction further indicates the feedback time limit.

17. A method in a wireless device for transmitting a feedback signal responsive to a data transmission from a communication device, the method comprising:
- receiving, from the communication device, a feedback scheduling instruction transmitted before a scheduling time limit expires, such that a feedback signal can be received by the communication device before a feedback time limit expires, the feedback scheduling instruction indicating at least one resource element scheduled for the feedback signal, and the feedback scheduling instruction including an indication of the feedback time limit, the feedback time limit indicating a maximum allowable time period between the communication device transmitting the data transmission and the communication device receiving the feedback signal, and the scheduling time limit and the feedback time limit each being dependent on at least one of a type of resource allocated to at least one of the data transmission and a type of traffic associated with the data transmission; and
- transmitting the feedback signal to the communication device using at least one of the at least one resource element, the at least one resource element being within the feedback time limit.

18. The method of claim 17, wherein the feedback signal is transmitted at a Medium Access Control (MAC) layer.

19. The method of claim 17, wherein the feedback signal is one of an Acknowledgement (ACK) and Negative Acknowledgement (NACK) signal.

20. The method of claim 19, further comprising:
- aggregating an ACK/NACK responsive to a portion of the data transmission with at least another ACK/NACK responsive to another portion of the data transmission in the feedback signal.

21. The method of claim 17, wherein the feedback signal is multiplexed with a data transmission to the communication device.

22. The method of claim 17, further comprising, prior to said receiving of the feedback scheduling indication:
- detecting an event that triggers transmission of the feedback signal; and
- transmitting, to the communication device, a scheduling request in response to the detection.

23. The method of claim 17, wherein the at least one resource element is selected from the at least one resource element based on the feedback time limit.

24. The method of claim 17, wherein the type of resource is one of a dedicated resource and a shared resource.

25. A wireless device for transmitting a feedback signal responsive to a data transmission from a communication device, the wireless device comprising:
- a receiving unit configured to receive, from the communication device, a feedback scheduling instruction transmitted before a scheduling time limit expires, such that a feedback signal can be received by the communication device before a feedback time limit expires, the feedback scheduling instruction indicating at least one resource element scheduled for the feedback signal, and the feedback scheduling instruction including an indication of the feedback time limit, the feedback time limit indicating a maximum allowable time period between the communication device transmitting the data transmission and the communication device receiving the feedback signal, and the scheduling time limit and the feedback time limit each being dependent on at least one of a type of resource allocated to at least one of the data transmission and a type of traffic associated with the data transmission; and
- a transmitting unit configured to transmit the feedback signal to the communication device using at least one of the at least one resource element, the at least one resource element being within the feedback time limit.

26. The wireless device of claim 25, wherein the feedback signal is transmitted at a Medium Access Control (MAC) layer.

27. The wireless device of claim 25, wherein the feedback signal is one of an Acknowledgement (ACK) and Negative Acknowledgement (NACK) signal.

28. The wireless device of claim 27, wherein the transmitting unit is further configured to aggregate an ACK/NACK responsive to a portion of the data transmission with at least another ACK/NACK responsive to another portion of the data transmission in the feedback signal.

29. The wireless device of claim 25, wherein the transmitting unit is further configured to multiplex the feedback signal with a data transmission to the communication device.

30. The wireless device of claim 25, further comprising:
a detecting unit configured to detect an event that triggers transmission of the feedback signal,
wherein the transmitting unit is further configured to transmit, to the communication device, a scheduling request in response to the detection.

31. The wireless device of claim 25, wherein the at least one resource element is selected from the at least one resource element based on the feedback time limit.

32. The wireless device of claim 25, wherein the type of resource is one of a dedicated resource and a shared resource.

* * * * *